United States Patent
Mercier

(10) Patent No.: US 10,989,797 B2
(45) Date of Patent: Apr. 27, 2021

(54) PASSIVE ALTIMETER SYSTEM FOR A PLATFORM AND METHOD THEREOF

(71) Applicant: BAE Systems Information and Electronic Systems Integration Inc., Nashua, NH (US)

(72) Inventor: Michael N. Mercier, Nashua, NH (US)

(73) Assignee: BAE Systems Information and Electronic Systems Integrations Inc., Nashua, NH (US)

( * ) Notice: Subject to any disclaimer, the term of this patent is extended or adjusted under 35 U.S.C. 154(b) by 204 days.

(21) Appl. No.: 16/325,980

(22) PCT Filed: Apr. 25, 2018

(86) PCT No.: PCT/US2018/029262
§ 371 (c)(1),
(2) Date: Feb. 15, 2019

(87) PCT Pub. No.: WO2019/209275
PCT Pub. Date: Oct. 31, 2019

(65) Prior Publication Data
US 2020/0408886 A1    Dec. 31, 2020

(51) Int. Cl.
| | |
|---|---|
| *G01C 5/00* | (2006.01) |
| *G05D 1/04* | (2006.01) |
| *G01S 7/495* | (2006.01) |
| *G01S 3/781* | (2006.01) |
| *G01S 3/786* | (2006.01) |
| *H04K 3/00* | (2006.01) |

(52) U.S. Cl.
CPC .............. *G01S 7/495* (2013.01); *G01S 3/781* (2013.01); *G01S 3/786* (2013.01); *H04K 3/43* (2013.01)

(58) Field of Classification Search
CPC .......... G01S 7/495; G01S 3/786; G01S 3/781; H04K 3/43
USPC ....................................................... 356/5.01
See application file for complete search history.

(56) References Cited

U.S. PATENT DOCUMENTS

| | | |
|---|---|---|
| 7,312,429 B2 | 12/2007 | Guyer et al. |
| 2015/0226551 A1 | 8/2015 | Lane |
| 2017/0248969 A1 | 8/2017 | Ham et al. |

OTHER PUBLICATIONS

International Search Report, Written Opinion of the International Searching Authority, 8 pages, dated Jul. 12, 2018.

*Primary Examiner* — Daniel L Murphy
(74) *Attorney, Agent, or Firm* — Scott J. Asmus; Sand, Sebolt & Wernow LPA

(57) ABSTRACT

A passive altimeter system comprising an angle between a point and a central boresight that is determined from distortion parameters of a lens in an infrared sensor in a countermeasure system on a mobile platform wherein the infrared sensor captures a first image for determining a distance between the platform and one of (i) a ground surface and (ii) a target, and the passive altimeter system further comprising a dimensional distance between two points in the first image that is determined from a secondary source external to the countermeasure system, and a processor to triangulate the distance between the platform and one of (i) the ground surface and (ii) the target based on the dimensional distance and the angle.

20 Claims, 6 Drawing Sheets ical Field

The present disclosure relates to a system and method determining the altitude of a mobile platform, such as a helicopter, utilizing dimensions obtained from an additional source. The present disclosure enables the altitude of the mobile platform to be determined when GPS signals are denied and when it is undesirable to utilize a laser range finding altimeter. Thus, the present disclosure relates generally to a GPS denied navigation solution.

Background Information

A countermeasure system, and more particularly an infrared countermeasure (IRCM) system, is configured to identify and detect an incoming threat to a platform. The IRCM system uses sensors to determine the threat, such as a ground-to-air missile or an air-to-air missile, and the location from where an enemy fired the threat or otherwise generated the threat. For the IRCM system to identify the location or source of the threat, the altitude of the platform should be known. The altitude of the platform can usually be obtained with an altimeter, which may utilized global positioning systems (GPS) or a laser range finder. However, GPS jammers are easily obtained and deployed by an enemy firing the threat. Thus, the platform, such as a helicopter, may not have access to its GPS signals. Furthermore, the laser range finder may be undesirable as an altimeter because the emission of the laser light can identify the location of the helicopter which may invite additional incoming threats from the enemy.

SUMMARY

Issues continue to exist with determining the height of an aircraft or other platform, especially in environments where GPS signals may be denied or where it may not be desirable to use an altimeter having a laser ranging system. The present disclosure addresses these and other issues by improving a legacy (i.e., existing) IRCM system by expanding and improving its traditional use by incorporating a terrain map, which is typically obtained from overhead satellite imagery. The present disclosure further addresses these issues by obtaining a known distance between two points from the terrain map, and triangulating the altitude of the platform based on the known distance between two objects obtained from the terrain map and pre-determined and known angular space distortion parameters in the sensors of the IRCM system.

In one aspect, an exemplary embodiment of the present disclosure may provide an altimeter system comprising: a platform adapted to be positioned at a distance relative to one of (i) a ground surface and (ii) a target; at least one sensor carried by the platform to capture a first image; a second image having a known resolution; at least one non-transitory computer readable storage medium having instructions encoded thereon that, when executed by a processor, perform operations to align the first image with the second image to triangulate the distance of the platform relative to the ground surface or the target, and the instructions including: store, at least temporarily, the first and second images on the at least one non-transitory computer readable storage medium; determine a dimensional distance in the first image based on corresponding similar features in the second image; determine an angle between a boresight and an object in the first image based, at least in part, on distortion parameters of the at least one sensor; and triangulate the distance from the platform to the one of (i) the ground surface and (ii) the target based, at least in part, on the dimensional distance in the first image and the angle. This exemplary embodiment or another exemplary embodiment may further provide wherein the platform is a movable platform, and the distance between the movable platform and the ground surface is an altitude of the movable platform. This exemplary embodiment or another exemplary embodiment may further provide wherein the movable platform is a helicopter. This exemplary embodiment or another exemplary embodiment may further provide wherein the second image is generated from a source that is remote from the platform. This exemplary embodiment or another exemplary embodiment may further provide wherein the instructions further include: determine the dimensional distance in the second image prior to associating the dimensional distance with the first image. This exemplary embodiment or another exemplary embodiment may further provide wherein the source generating the second image is a secondary source providing the second image in a similar direction as the at least one sensor. This exemplary embodiment or another exemplary embodiment may further provide a second sensor carried by the platform spaced from the at least one sensor; a first wide angle field of view associated with the at least one sensor; a second wide angle field of view associated with the second sensor; wherein the ground surface or the target is located in an overlap region defined by the first wide angle FOV overlapping the second wide angle FOV. This exemplary embodiment or another exemplary embodiment may further provide a sloped ground surface in the overlap region and the target is an obstacle in the overlap region. This exemplary embodiment or another exemplary embodiment may further provide detecting the sloped ground surface or the obstacle in the overlap region as the platform is descending towards the ground surface; and warn an operator that the ground surface is sloped or of the obstacle below the platform. This exemplary embodiment or another exemplary embodiment may further provide displaying a surface contour map of the ground surface below the platform, as the platform is descending, to the operator. This exemplary embodiment or another exemplary embodiment may further provide a plurality of sensors carried by the platform, wherein the at least one sensor is part of the plurality of sensors; a third image captured by a second sensor from the plurality of sensors; an overlap region present in each of the first image and the third image, wherein a unique marker is in the overlap region; and the instructions further including: determine proximity of the platform respectively to the unique markers in the proximity region based, at least in part, on known mounting locations of the first and second sensors on the platform and on known distortion parameters of a lens on each of the first and second sensors. This exemplary embodiment or another exemplary embodiment may further provide wherein the at least one sensor and the second sensors carried by the platform are passive infrared (IR) sensors, wherein at least the first image is an IR image. This exemplary embodiment or another exemplary embodiment may further provide wherein the instructions further include comparing the IR first image with the second image which is one of (i) an IR image, and (ii) a non-IR image. This exemplary embodiment or another exemplary embodiment may further provide wherein the instructions further include activating the sensor, which is part of an infrared countermeasure (IRCM) system, to determine the distance between the platform and the ground surface responsive to a global positioning system (GPS) in the platform being denied.

In another aspect, one embodiment of the present disclosure may provide a method comprising: providing an aircraft with a legacy infrared counter measure (IRCM) system including at least one countermeasure sensor adapted to locate threats approaching the aircraft; capturing at least one infrared (IR) image with the at least one countermeasure sensor; receiving a second image from a remote source; determining a fixed dimensional distance between two points in the second image; determining, in the first image, an angle between the at least one countermeasure sensor and each of the same two points based, at least in part, on and accounting for distortion parameters of a lens in the at least one countermeasure sensor relative to a central boresight thereof; and triangulating an altitude of the aircraft relative to the ground with the legacy IRCM system based on the fixed dimensional distance between the same two points and the angle between the at least one countermeasure sensor and each of the two points. This exemplary method or another exemplary method may further provide retrofitting the legacy IRCM system to calculate altitude of the aircraft; triangulating the altitude of the aircraft in a GPS denied environment and without a laser range finder. This exemplary method or another exemplary method may further provide descending the aircraft towards a ground surface; generating a surface contour map in a display for a pilot, wherein the surface contour map is generated from the plurality of IR images captured by the at least one countermeasure sensor. This exemplary method or another exemplary method may further provide detecting a sloped surface beneath the aircraft prior to landing; and effecting the aircraft to move to a flat ground portion. This exemplary method or another exemplary method may further provide determining a second dimensional distance in the first image to increase the accuracy of the altitude of the aircraft.

In another aspect, an embodiment of the present disclosure may provide a passive altimeter system comprising an angle between a point and a central boresight that is determined from distortion parameters of a lens in an infrared sensor in a countermeasure system on a mobile platform wherein the infrared sensor captures a first image for determining a distance between the platform and one of (i) a ground surface and (ii) a target, and the passive altimeter system further comprising a dimensional distance between two points in the first image that is determined from a secondary source external to the countermeasure system, and a processor to triangulate the distance between the platform and one of (i) the ground surface and (ii) the target based on the dimensional distance and the angle.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

Figure 1:
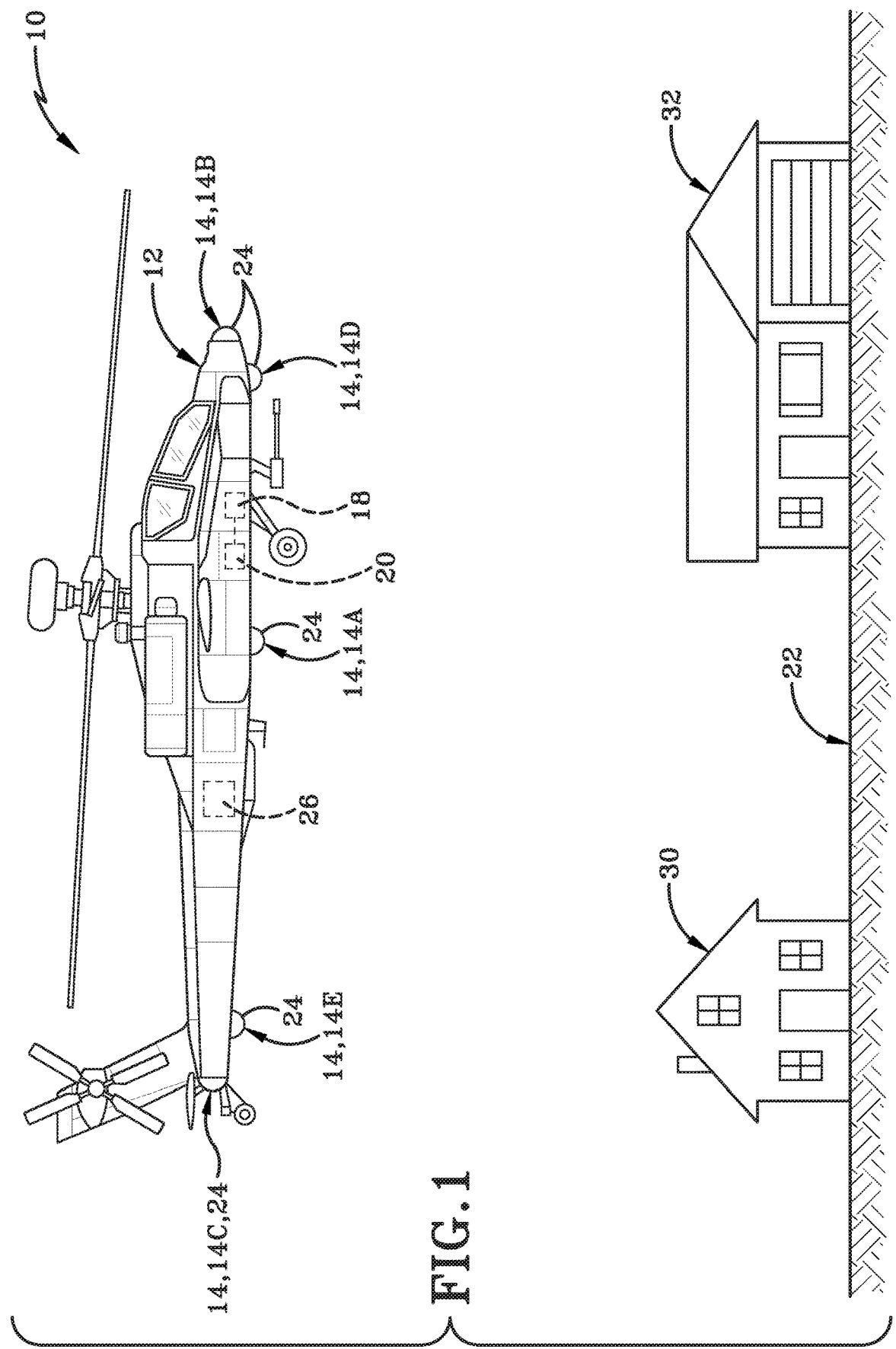
FIG. 1 (FIG. 1) is a schematic view of a passive altimeter system in accordance with the present disclosure.

A passive altimeter system in accordance with the present disclosure is shown generally throughout the figures at 10. The passive altimeter system 10, which may be generally referred to as an altimeter system 10, may include a platform 12, at least one sensor 14 carried by the platform 12 that is configured to capture at least one first image or at least one first video, a second image or a second video that is shown generally at 16 (FIG. 2), and at least one non-transitory computer readable storage medium 18 carried by the platform 12. The storage medium 18 has instructions encoded thereon that, when executed by a processor 20, perform operations to align the first image with the second image 16. A dimensional distance from the second image 16 may be populated into the first image to triangulate the distance between the platform 12 relative to the ground surface 22 (i.e., an altitude) or a target (i.e., a range).

The platform 12 may be any movable platform that can move relative to the ground surface 22. In one particular embodiment, platform 12 may be an aerial vehicle. However, in other implementations or other embodiments, the platform 12 may be a ground based vehicle that moves, such as a car, truck, or tank. When the platform 12 is implemented as an aerial vehicle, the aerial platform 12 may be either manned or unmanned. In some implementations, the platform 12 may be a manned aerial platform that is piloted by a human operator. In one particular embodiment, the platform 12 is a helicopter or rotor craft.

The platform 12 includes an inertial navigation system 26 which is in operative communication with a countermeasure system on the helicopter. The inertial navigation system 26 is a self-contained navigation system in which measurements provided by accelerometers and gyroscopes are used to track position and orientation of the platform 12 relative to a known starting point, orientation, or velocity. The INS 26 may include an inertial measurement unit (IMU), which may include three orthogonal rate-gyroscopes and three orthogonal accelerometers, measuring angular velocity and linear acceleration respectively. The INS 26 may further include a GPS component to identify the location of the platform 12 when it is moving and the IMU on the INS 26 is observing the angular velocity and linear acceleration. The GPS component of the inertial navigation system 26 may be used by the legacy countermeasure system to determine the altitude of the platform 12. Additionally, the INS 26 can be used to determine and process signals from the gyroscopes and accelerometers to track the position and orientation of the platform 12. In one particular example, the INS 26 may be considered a stable platform system, or may be considered a strap-down system, or may utilize micro-machined electromechanical systems (MEMS) devices. In some implementations, the MEMS devices may be beneficial inasmuch as they offer rugged, low cost, small and lightweight inertial sensors relative to other available technologies. When GPS signals are denied, the INS 26 cannot be used to determine the altitude of the platform 12 inasmuch as the GPS component is jammed. Stated otherwise, the jamming of the GPS component prevents the INS 12 from performing the necessary calculations to determine the altitude of the platform 12.

The platform 12, which may also be referred to as helicopter 12, includes a legacy (i.e., preexisting) infrared countermeasure (IRCM) system. The IRCM system is configured to identify and detect an incoming threat to the helicopter 12, such as a ground-to-air missile fired from an enemy on the ground towards the helicopter 12, or a missile fired at the helicopter 12 from another airborne vehicle. As part of the IRCM system on the helicopter 12, the sensor 14 may be one of a plurality of sensors carried by the helicopter 12 that provide full coverage for viewing and detecting incoming threats to the helicopter 12.

In one particular embodiment, the sensor 14 may be a first sensor 14A and may be positioned approximately longitudinally midway between a front or second sensor 14B and a tail or third sensor 14C. The helicopter 12, and more particularly the IRCM system on helicopter 12, may additionally include a fourth sensor 14D and a fifth sensor 14E. Similar to the first sensor 14A, the fourth sensor 14D and the fifth sensor 14E may look downwardly through an opto-convex lens 24. In some implementations, the opto-convex lens 24 may sit flush with the outer shell of the helicopter 12, and in other embodiments, the opto-convex lens 24 may protrude or bulge outwardly from the outer surface of the helicopter 12.

Figure 3:
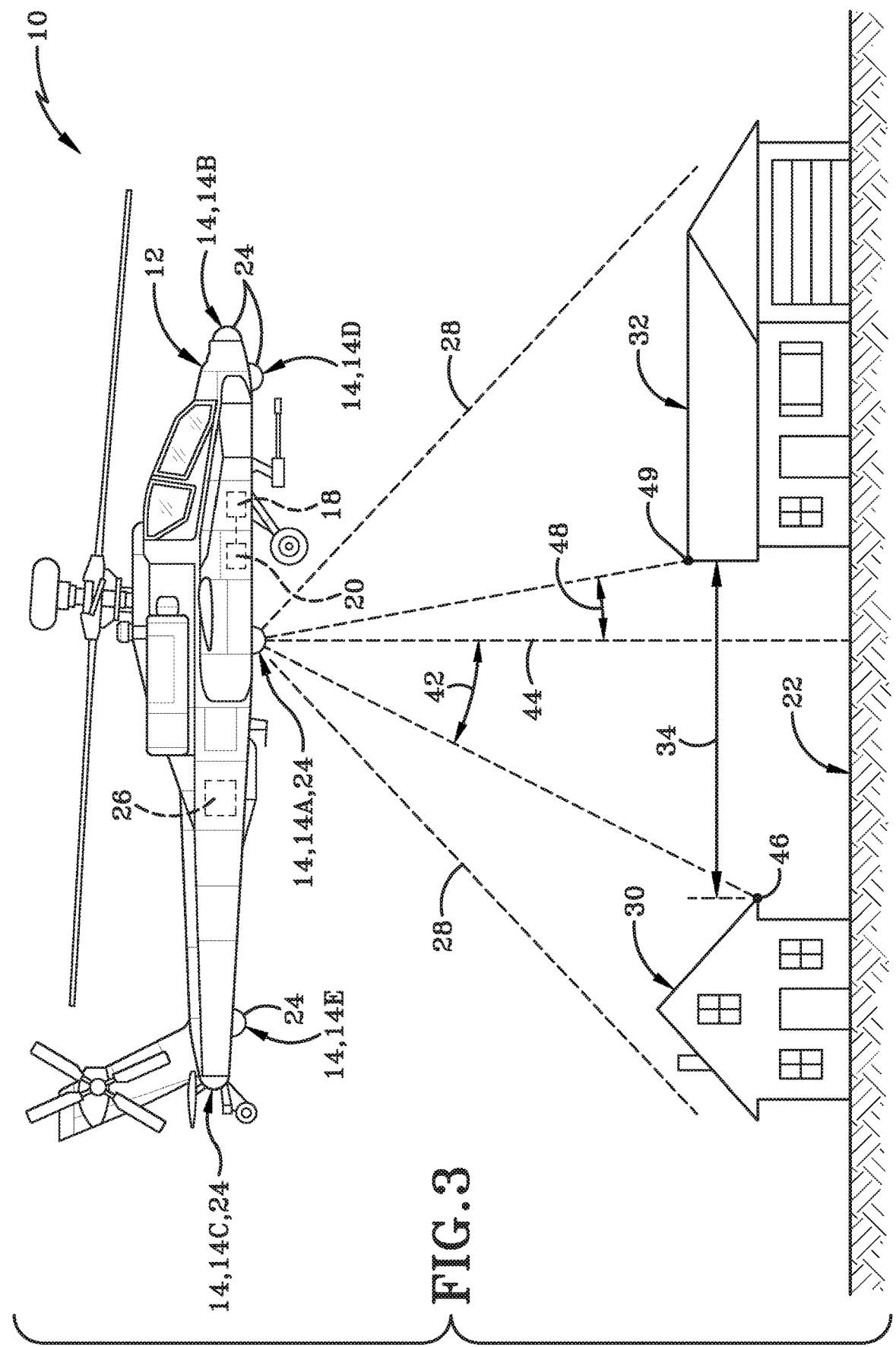
FIG. 3 (FIG. 3) is an operational schematic view of the passive altimeter system measuring the altitude of the platform from an existing legacy sensor in a countermeasure system.

At least one of the sensors 14 may be an infrared (IR) sensor. The at least one sensor 14 generates an IR image as the platform 12 moves relative to the ground surface 22. When the platform 12 is a helicopter flying above the ground surface 22, the IR first image is generally a downwardly looking image that captures features of the ground and objects thereon that are within the field of view of that sensor. In one particular embodiment, the at least one sensor 14 has a wide-angle field of view 28 (FIG. 3).

The storage medium 18 may be a computer storage medium as understood by one having ordinary skill in the art. Furthermore, the instructions that are encoded on the storage medium 18 may be programed in a manner so as to effectuate storage size and reduce processing power when they are executed by the processor 20. The instructions on storage medium 18 may, when executed by the processor 20, store, at least temporarily, the first image obtained from the at least one sensor 14 and the second image 16 on the at least one non-transitory computer readable storage medium 18. Additionally, the instructions may align features in the first image to corresponding similar features in the second image 16. Further, the instructions may populate a dimensional distance determined from the second image into the first image. In one particular embodiment, the resolution is known or predetermined in the second image 16. Aligning features in the first and second image 16 is based at least in part on distortion parameters associated with the at least one sensor 14 and on scale parameters of the first and second images 16. The instructions may additionally include an instruction to triangulate the distance from the platform 12 to the ground surface 22 (i.e., the altitude) or a target (i.e., the range between the platform and the target) based, at least in part, on a known distance between the two objects in the first image that are present in the second image 16 obtained from second image 16.

In addition to those instructions discussed above, the instructions may activate the system 10 to identify the distance between two objects in the second image 16. The instructions may accumulate a plurality of second images so as to enable the first image to be compared to a plurality of different images as the platform 12 moves relative to the ground. The instructions may adjust the first image based on distortion parameters known to exist in the lens of the sensor 14 to effectuate the alignment of the first image with the second image 16. The instructions may execute a call to determine the location of the platform 12 based on a last known location using the GPS on the INS 26 prior to the GPS signal being denied. The instructions may compare different components or aspects from the first and second images, and use the compared values in conjunction with distortion parameters of the sensor to obtain the altitude of the platform 12 through triangulation techniques. The instructions may also convert pixel dimensions in the first image into angular space dimensions based on known distortion parameters of the lens in the sensor 14. The instructions may decrease power consumption by their execution in the legacy processor 20. The instructions may detect the altitude in the platform 12 through use of a legacy IR sensor 14 in response to the GPS signal in the INS 26 being jammed or denied. The instructions may also disable a laser range finder altimeter on the platform 14 to prevent an outside source from detecting the same. The instructions may document the determined altitude and provide the altitude back to the IRCM system on the platform so the IRCM system may use the altitude in accordance with its countermeasure duties, such as finding incoming threats or the original location of the threat. The instructions may constantly, selectively, sporadically, intermittently, or consistently evaluate the determined altitude of the platform 12 while the platform is descending or landing through only the use of IR imagery and without GPS or lasers. The instructions may facilitate the transmission of the determined altitude to the operator of the platform, which may be displayed in a variety of different manners. The instructions may hierarchically execute altitude determining functions or processes, wherein the INS 26 with GPS is the primary altimeter for the platform and the system 10 is a passive or secondary altimeter that is used responsive to the GPS being denied in the primary altimeter. The instructions may maximize the accuracy of the altitude determined by the system 10 by using more than one dimension in the second image 16 to populate into the first image for the triangulation altitude calculations. The instructions may optimize performance by negating aspects of one image that are not present in the second image so that processing power is not wasted looking for objects in one image that are absent from the other. The instructions may range the platform relative to another target that may be located on the ground or may be in the air, thus, while the system 10 is primarily considered a secondary or a passive altimeter system, the system may also be a ranging system to find the distance between the platform and a target. The instructions may, in some alternative embodiments, use the distance between the platform and the target to assist in guiding the platform during its flight.

With continued reference to FIG. 1, a first object 30 and a second object 32 are located on the ground surface 22. In one particular embodiment, the first object 30 is a structure, such as a building, and the second object 32 is a different structure or different building. However, it is entirely possible that the first and second objects may not be buildings and may rather be geographical features or landmarks, such as a river or the intersection of two streets or roads.

Figure 2:
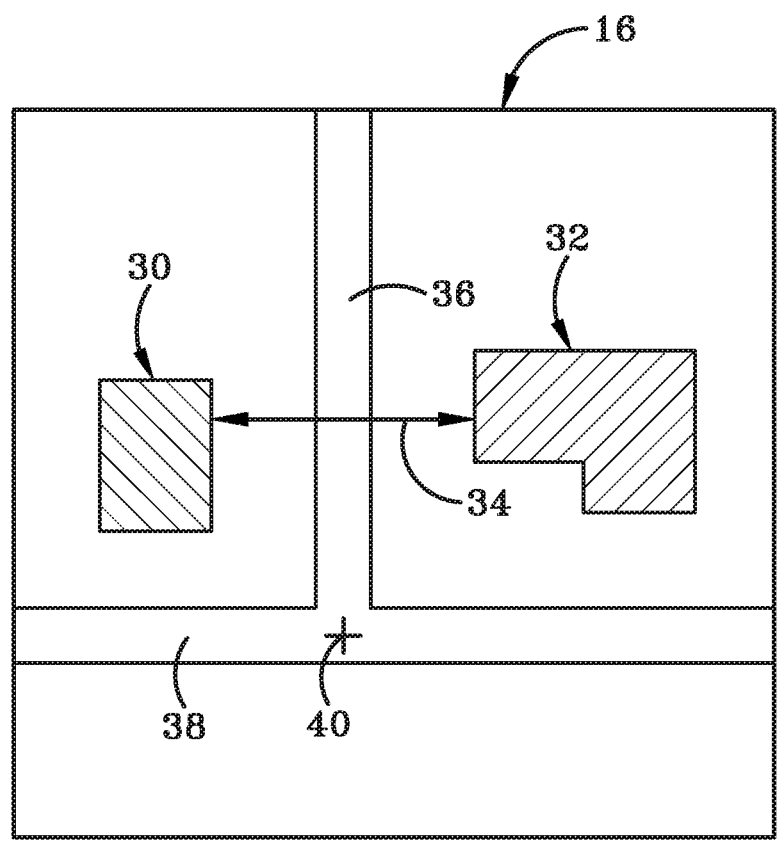
FIG. 2 (FIG. 2) is a schematic top plan view of an image depicting two objects with a known distance therebetween based on preexisting parameters of the image.

FIG. 2 depicts an exemplary terrain map or second image 16. In one particular embodiment, the second image 16 is a satellite obtained image having a known resolution. The known resolution of the second image 16 enables the processor 20 to determine a dimensional distance 34 between the first object 30 and the second object 32. More particularly, the processor 14 calculates and determines the dimensional distance 34 between a first point 46 (FIG. 3) on the first object 30 and a second point 49 (FIG. 3) on the second object 32. In one particular embodiment, the satellite imagery used to generate the second image 16 is obtained from a satellite imagery database, such as Google Earth, Google Maps, Earth Explorer, Digital Globe, Land Sat Imagery, or the like.

FIG. 2 further depicts a first street 36 intersecting a second street 38. The intersection 40 could also be used to determine a distance between intersection 40 and the point on the first object or first building 30, or a distance between the intersection 40 and the second point 49 on the second building or second object 32. For the system 10 to determine the altitude of the platform 12, at least one distance, such as dimensional distance 34, must be obtained in the second image 16 based on the known or predetermined resolution thereof. However, it is to be understood that the dimensional distance 34 between two objects or two points on the image may be obtained based on other parameters in the second image 16. Further, the accuracy of the altitude calculation increases as the number of dimensions from the second image 16 are used in the triangulation calculation. However, in order for more dimensions to be used from the second image 16, the same objects must be present in the first image from the sensor 14.

FIG. 3 depicts an operational schematic view of the system 10. The at least one sensor 14, and more particularly the first sensor 14A, broadcasts its wide-angle field of view 28 downwardly towards the ground surface 22. The wide-angle field of view 28 of the first sensor 14A captures the first image containing the first object 30 and the second object 32. Recall, as shown in FIG. 2, the first object 30 and the second object 32 and the distance 24 between them was established by the second image 16. The processor 20 calculates a first angle 42 between the central boresight 44 of the sensor 14A and the first point 46 on the first object 30. The first angle 42 is determined by the processor 20 based on the distortion parameters of the opto-convex lens 24 on the first sensor 14A. Similarly, the sensor 14A determines a second angle 48 from the second point 49 on the second object 32 relative to the boresight 44 of the first sensor 14A. The distance between the first point 46 and the second point 49 is equal to the dimensional distance 34 as obtained from the second image 16. The second image 16 may be satellite imagery generated from a remote or secondary source (i.e. a satellite) from the system 10. The altitude of the aircraft above the ground surface 22 is measured at a location that is coaxial along the boresight 44 of the sensor 14A that is observing the first object 30 and the second object 32.

In one particular embodiment, the sensor 14 is one sensor from a group or plurality of sensors mounted on the mobile platform 12. Further, in one particular embodiment, the sensor 14 is an existing or legacy sensor utilized for the IRCM system. One of the sensors may look directly downward (e.g. sensor 14A) while other sensors that are part of the infrared countermeasure system are located on other portions of the body of the platform facing other directions (e.g. sensor 14B or 14C). For example, there may be the sensor 14C located near the tail or the rear end of the platform and there may be the sensor 14B located near the front of the nose of the platform and there may be additional downwardly looking sensors 14D, 14E at other locations of the aircraft. In some implementations, sensors 14 are passive IR sensors having the fisheye or opto-convex lens 24 that includes at least one convex surface which affects the distortion of the image captured by the IR sensor 14. The distortion characteristics associated with each lens 24 on each respective sensor is known prior to installation of the IR sensor on the mobile platform. Stated otherwise, distortion parameters or characteristics are tested and determined in the laboratory, usually by the manufacturer of the sensor 14. The distortion characteristics represent constants and standard calculations that need to convert portions of pixels in the first image relative to the central boresight 44 of the sensor 14. In some implementations, the distortion characteristics are recorded by a manufacturer in a laboratory and installed in a memory or hard drive or storage medium 18 associated with the sensor 14. By inputting the distortion characteristics and storing them in the associated memory or storage medium 18, the processor 20 for the platform or a processor on a computer carried by the platform 12 can access the distortion characteristics stored in the memory or storage medium 18 of the IR sensor 14 to enable faster processing that will allow the altitude of the mobile platform 12 to be determined in a real time or substantially near real time as observed by the pilot of the platform 12.

The distortions parameter or characteristics are measured from the boresight 44 which closely approximates or is the center of the first image or the center of the sensor 14. Every pixel in the first image generated by the sensor 14 is calculated relative to a function in angular space relative to the boresight 44 of the respective sensor 14. Every pixel has a function of X or Y pixel space that can convert to an angle space from the boresight 44. Each sensor 14 may have or be associated with an inertial measurement unit (IMU) that identifies the downward direction. Thus, the processor 20 can take the information of the downward direction obtained from the IMU, the location of the boresight 44 from the sensor 14, and the distortion associated with each pixel as it relates to angular space relative to the boresight, and use these three pieces of information with the known dimensional distance 34 from the second image 16 (i.e., a terrain map or other overhead satellite imagery) and a triangulation calculation can obtain the altitude of the platform 12.

The manner in which the platform 12 identifies its location relative to the terrain map or second image 16 is accomplished by analyzing the second image 16 such that the platform 12 knows its general or approximate location relative to the terrain map. A search algorithm enables the platform processor 20 to determine where the location of the platform is relative to the terrain map or second image 16. Search algorithms typically refer to a situation where the platform 12 may first have a GPS signal and know its coordinates and then if the GPS becomes denied, the process or instructions or algorithm can identify where the platform is located from additional inputs received from one or more IMUs because the platform moves relatively slowly. The search algorithm identifies features obtained and viewed by the IR sensors 14 and compares the features to the second image 16 to identify the location of the platform. Typically, the sensors 14 carried by the platform 12 capture a video stream in real time such that the real time calculations occur between the IR sensor and the second image 16, which may be map or satellite-based image.

In accordance with one exemplary embodiment of a method of the present disclosure, the system first calculates where the platform 12 is relative to the second image 16, which may be a terrain map or overhead satellite imagery. The system then processes and compares the video stream or first image obtained by the IR sensor 14 with the second image 16, determines a known distance on the second image 16 based on some predetermined characteristic of the second image 16, such as its resolution, and then determines the altitude of the platform 12 utilizing the known distance on the satellite image between two objects and the angular distortion characteristics of the lens 24 and each respective pixel in the first image captured by the IR sensor 14. In one particular embodiment, the IR sensor 14 that is utilized as part of the present passive altimeter system is a sensor that points directly downward from the mobile platform 12. More particularly, the sensor may be a wide angle video IR sensor. The wide angle video IR sensor may be an existing legacy sensor part of the IRCM system on the aircraft. Thus, in accordance with one aspect of the present disclosure, the system is able to utilize an existing IRCM system and perform a new secondary function for determining the altitude of the aircraft without increasing SWaP requirements (i.e., size, weight, and power). For example, since the present disclosure utilizes existing IRCM sensors, the altimeter system is beneficial inasmuch as it does not increase size and weight. The additional processing power utilized to run the calculations is substantially negligible. Thus, in accordance with another aspect of the present disclosure, an embodiment of a method of the present disclosure may provide for the retrofitting of an existing helicopter 12 having an IRCM system thereon with the passive altimeter calculations or instructions stored in the storage medium 18 or other hardware storage device so that it may be processed by an existing processor 20 already on the platform 12.

Any IR sensor 14 that is part of the IRCM system can be utilized to determine the altitude of the aircraft. In one particular embodiment, the system uses the IRCM sensor 14A that points directly downward inasmuch as it closely mimics the terrain map or overhead satellite imagery of the second image 16 that is used for comparison of the image or video stream capture by the IRCM sensor. However, it should be noted that it is entirely possible to use another IR sensor on the platform, such as one that is angled relative to the ground instead of establishing a normal orientation relative to the ground. If one of the sensors is utilized that is angled relative to the ground, such as sensor 14B or 14C, additional calculations would be needed to accommodate for additional distortions and angles obtained from the video IR stream during its comparison with the overhead satellite imager or terrain map. By making additional use of the downwardly facing IR sensor, the present disclosure enables at least one of the IR sensors that are part of the IRCM system to have dual functions. More particularly, the dual functions associated with the downwardly facing IRCM sensor is to identify incoming ground-to-air missiles or other threats that are approaching the platform, and to capture IR video or IR images for comparison with the known terrain map or satellite image to determine the altitude of the platform 12. Stated otherwise, a legacy IR sensor on the helicopter is programmed and instructed to accomplish a secondary function of an altimeter sensor when GPS signals are denied and it is otherwise undesirable to utilize a laser range finder to determine the altimeter. Thus, the system of the present disclosure may be considered a passive altimeter.

With respect to the triangulation, the system utilizes the second image 16 or terrain map or overhead satellite imagery to identify the known dimensional distance 34 thereon. Typically the known dimensional distance 34 is identified by determining two easily recognized points 46, 49 and finding the distance therebetween. For example, the system 10 may identify a cluster of buildings or a large intersection or even a road to determine a known distance between two objects on the terrain. The satellite map is able to determine the dimensional distance 34 between the two objects 30, 32 on the map, similarly to what is understood to be a line drawing function on satellite imagery such as Google Maps. This known dimensional distance 34 is used in conjunction with the angles 42, 48 adjusted for distortion used and determined by the IR sensor 14 to complete the triangulation function in order to establish the altitude of the aircraft or platform 12. The formulas for determining the angle of distortion from the wide angle video sensor lens relative to an object on the ground depend on how the lens was characterized by the manufacturer. A typical formula for a wide field of view lens is a quadratic fit from the boresight of the optics, but this is not always the case. In one particular embodiment, for a given pixel, the azimuth from the top of the sensor is determined by arctan 2 ((pixel row−boresight row), (pixel column−boresight column)). The "pitch", or angular distance from the boresight, is from the quadratic formula and may provide Distance=sqrt((pixelrow−boresightrow)^2+ (pixelcolumn−boresightcolumn)^2). The Angle is Angle=LensCoefficient1*Distance+ LensCoefficient2*Distance^2+ . . . +LensCoefficientN* Distance^N.

The known information is then put into a triangulation formula which is an iterative process, not formulaic. For each detected object on the ground, the system knows its position in X, Y, Z from the map. The system also knows the azimuth and elevation angle from the platform to the object. Thus, there is a point and a unit vector, which defines a line. A line is defined in this way for each point on the ground. The intersection of these points is the location of the aircraft in X, Y, Z. The Z component represents the altitude.

The triangulation formula and calculations become more accurate when more than two known points are input. These known points on the ground are observed by the satellite imagery or terrain map. While it is possible for the altitude to be determined when a distance between two points is utilized, the altitude can be more accurately calculated when three or more points are used during the triangulation process. When using three or more points, a weighting calculation is utilized based on the angle of distortion of the wide angle video lens relative to the known object on the ground. Each pair of lines has a line segment defined by their closest positions. The center of that line segment defines the location estimate for that pair. Those centers are weighted by the orthogonality of the line pairs, that is, the more orthogonal the two lines are, the more heavily that location is weighted. This is done by calculating the center of mass, in three dimensions, assuming each line pair create a mass at the center of the line segment defined by their closest positions that is whose mass increases relative to the orthogonality of the line vectors.

In accordance with one exemplar aspect, the sensor 14 may be a Wide Angle passive infrared (PIR) Sensor. The wide angle PIR sensor 14 may feature a detection angle that is larger than 180°. This may be beneficial in applications where users or pilots or the system 10 need to track movements or incoming threats across a large, open area. In one embodiment, the Wide Angle PIR Sensor may be a pyroelectric device, and it may detect motion by sensing changes in the infrared levels emitted by surrounding objects. In other embodiments, the Wide Angle PIR sensor 14 may be other types of electric devices. The Wide Angle PR sensor 14 may provide passive warning of missile approaching the platform using a warning systems, such as the AN/AAR-57 Common Missile Warning System (CMWS) or the AN/ALQ-144 or the AN/ALQ-157, which detects the missile, rejects false alarms, and cues the onboard infrared jamming system's jam head to the missile's location. When the jam head finds the missile with its IR tracking system, it emits a high energy infrared beam to defeat the missile's infrared seeker.

Figure 4A:
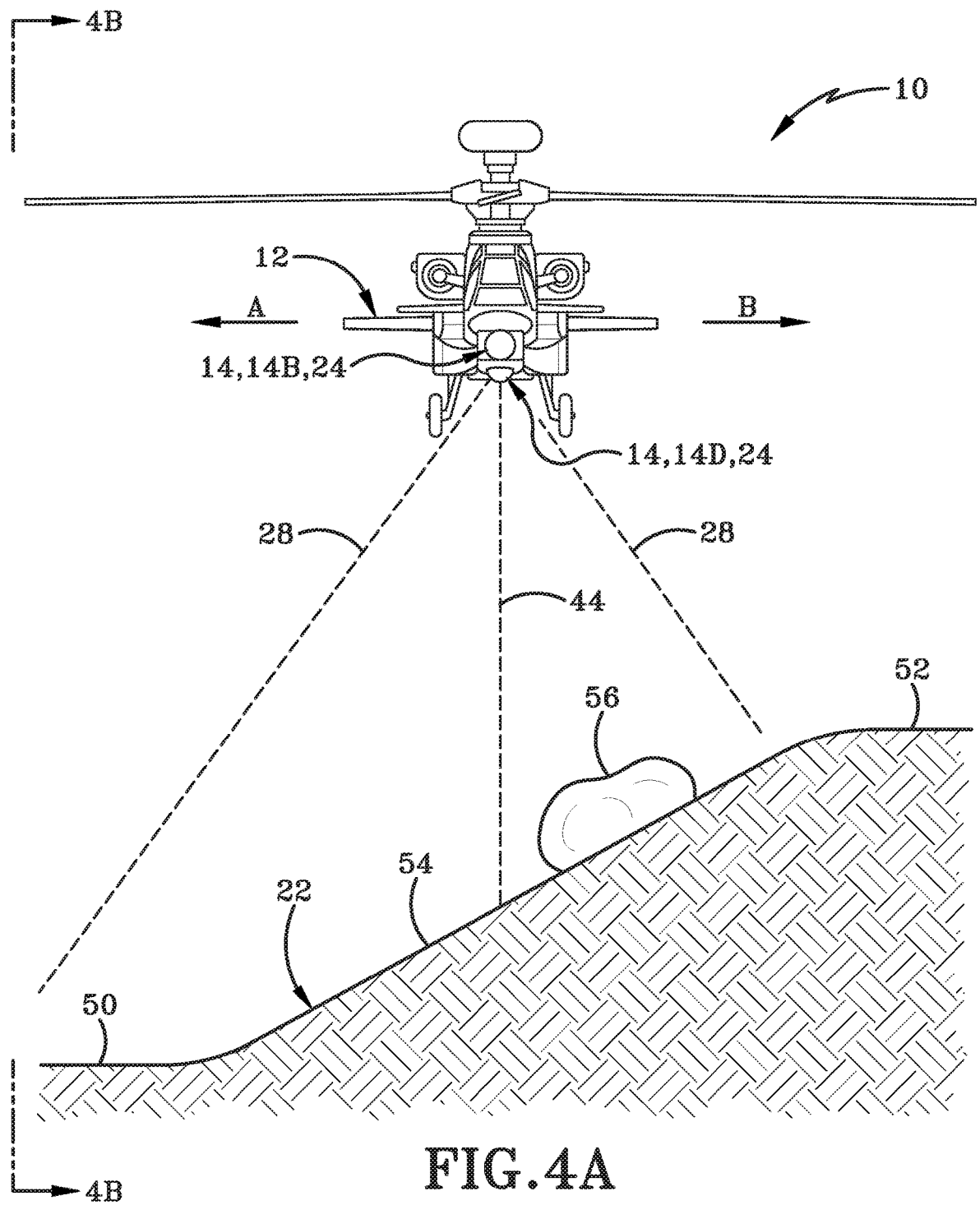
FIG. 4A (FIG. 4A) is a schematic front elevation view of a platform descending towards a sloped ground surface utilizing the altimeter of the present disclosure to alert a pilot the platform should be moved to level ground to land the platform.
Figure 4B:
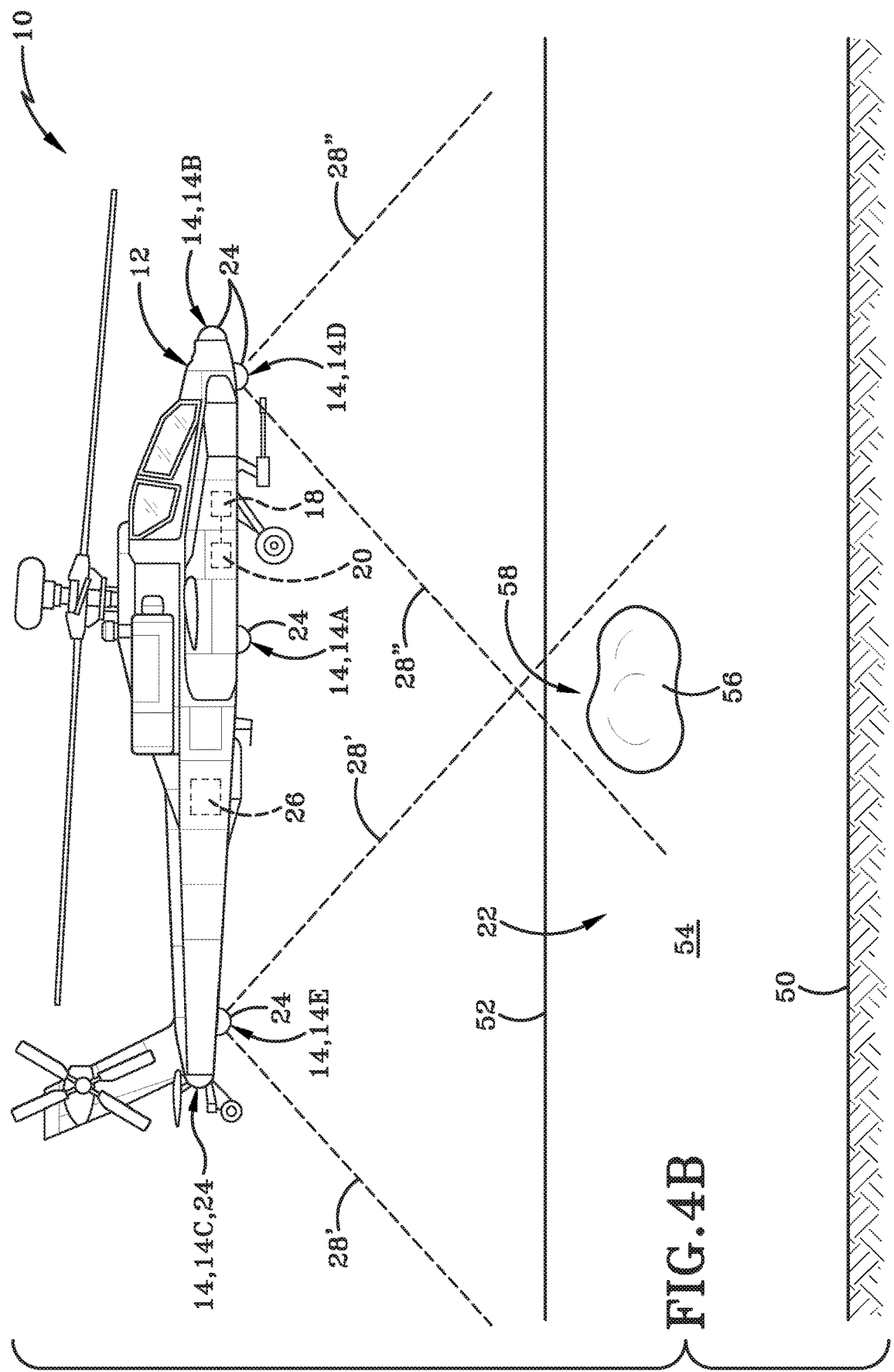
FIG. 4B (FIG. 4B) is a schematic operational side view taken along line 4B-4B in FIG. 4A depicting the passive altimeter system of the present disclosure identifying an obstacle or marker in the landing region to alert an operator thereof so that the operator should move the platform to a safe landing location.

FIG. 4A and FIG. 4B represent a schematic operational view of the altimeter system 10. In accordance with one particular embodiment, the altimeter system 10 can be used to assist the platform 12 while descending in an attempt to land the platform 12 on the ground surface 22. In some instances, the ground surface 22 may include a flat lower portion 50, a flat upper portion 52, and a sloped portion 54 having an angle or grade of the surface extending between the flat lower portion 50 and the flat upper portion 52. In addition, there may be an obstacle, such as a boulder or rock, which is shown generally as obstacle 56.

With continued reference to FIG. 4A and FIG. 4B, the altimeter system 10 may activate at least two sensors 14 carried by the platform 12. Each sensor 14 broadcasts its wide-angle field of view 28 such that it encompasses at least a portion of the sloped surface 54 and the obstacle 56, which may further be referred to as a marker 56. The altitude of the platform 12 is measured along the boresight 44 of the at least one sensor 14 to determine the distance between the platform 12 and the sloped surface 54. This information is relayed or otherwise provided to the operator of the platform 12 and identifies the fact that the sloped surface 54 is below the platform 12. The operator will use this information and move the platform 12 to a flat location, such as the flat lower ground portion 50 or the flat upper ground portion 52. More particularly, the operator can translate the position of the platform 12 in the direction of arrow A towards the flat lower ground portion 50 in response to the system 10 identifying that the sloped surface 54 is below the platform 12. Alternatively, the operator of the platform 12 may translate the position of the platform 12 in the direction of arrow B towards the flat upper portion 52 in response to the system 10 identifying that the sloped surface 54 is below the platform 12. The reason for the translation in the direction of arrow A or B is to move the platform 12 such that it is able to descend and land on a flat surface. As is well known in the art, landing a platform, such as a helicopter, on a sloped surface 54 is undesirable because the incidents of crash landing or crashing while taking off due to rollover is increased.

FIG. 4B depicts an operational view utilizing two sensors 14 from the IRCM system to identify the obstacle or marker 56 that is in the general landing zone or landing area of the platform 12. Two of the sensors 14 may be activated such that their respective wide-angle fields of view 28 overlap the obstacle marker 56. As shown in FIG. 4B, the fourth sensor 14D broadcasts a wide-angle field of view 28' and the fifth sensor 14E broadcast a second wide-angle field of view 28". The first wide-angle field of view 28' from sensor 14D overlaps the second wide-angle field of view 28" from sensor 14 at an overlap region 58. The obstacle or marker 56 located in the overlap region is identified by establishing an angle between each respective sensor (in this case sensor 14D and sensor 14E) and the known sensor mounting locations on the platform 12, and the distortion parameter characteristics of each respective sensor relative to its boresight. Collectively, these features are used to calculate and identify the location of the obstacles or marker 56 in the overlap region 58 which is within the landing area or landing zone of platform 12. The system is able to identify and warn the pilot or operator of the platform 12 of the existence of the obstacle or marker 56 in the overlap region 58. The pilot can then move the platform 12 relative to the ground surface, such as in the direction of arrow A or arrow B, to avoid the obstacles or marker 56 as the platform 12 descends or lands on a flat ground surface.

In accordance with another embodiment, the altimeter system can use similar teachings to those identified in FIG. 4A and FIG. 4B to build a surface contour map of the ground surface 22 located below the platform 12. The surface contour map may then be displayed to the pilot or operator of the platform 12 in a number of different ways. In one particular embodiment, the surface contour map observed by the IRCM system and its sensors 14 are integrated into a legacy display system carried by the platform. In another embodiment, the surface contour map below the platform 12 is conveyed to the pilot in a heads up display worn by the pilot and integrated into the pilot's helmet such that it is displayed directly onto an eye shield or a tinted lens of the helmet.

With continued reference to FIG. 4B, the present disclosure notes that any two sensors from the legacy IRCM system may be utilized to create the overlap region 58 to identify a sloped surface 54 or the obstacle or marker 56. While this exemplary embodiment identifies the fourth sensor 14D and the fifth sensor 14E, this is meant to be exemplary in its explanation and the appended claims may generally make reference to a first sensor and a second sensor, which can refer to any two sensors or other sensors respectively. In this instance, the sensor 14D may capture the first image, and the sensor 14E may capture a third image. The overlap region 58 may thus be defined by the overlap of the first image and the third image. The obstacle or marker 56 is in the overlap region 58. The system may include marker or object detection logic. In some instances, it is the instructions that include the objection detection logic to determine proximity of the platform 12 respectively to the unique markers 56 in the proximity region based, at least in part, on known mounting locations of the two sensors on the platform and on known distortion parameters of a lens on each of the first and second sensors.

In accordance with another operational aspect of the present disclosure, the passive altimeter system 10 can be utilized to identify and determine and assist in the landing of the platform as discussed above and shown in FIG. 4A and FIG. 4B. The system may use a first downwardly observing IR sensor and a second downwardly observing IR sensor on the platform. Typically, a platform, such as a helicopter, will crash when it lands too hard. Thus, the system can be used in conjunction with or integrated into a landing system on the platform. The altimeter system 10 can identify when the platform is approaching the ground in real time and is able to identify markers, such as large obstacles 56 (i.e., a rock, a boulder, fallen limbs or tree trunks, or slopes, swales or streams or embankments). In one particular embodiment, the passive altimeter 10 of the present disclosure is integrated into a legacy landing system, and the platform determines the slope of the surface upon which the platform desires to land and the speed at which the platform 12 is descending.

It is important because in the instance of a helicopter as the platform, a helicopter needs to take off from a substantially level surface because if it is unleveled or slanted, when the helicopter tries to take off, it will tip over and crash. The system of the passive altimeter integrated into the landing system takes advantage of the fact that two or more of the wide angle IR sensors are not co-located on the platform. For example, one of the downwardly facing IR sensors may be located near the front or cone of the aircraft and another of the downwardly facing sensors may be located near the rear or tail of the aircraft. Since each of the IR sensors may be a wide-field view, there is an overlap region from each of their respective fields of view. The overlapping fields of view enable the passive altimeter system that is integrated into the landing system of the platform to triangulate on to a marker, such as the large rock, to identify its location and identify to the pilot of the platform to avoid the same during the landing process. The wide angle overlap region 58 of the two IR sensors can be processed to build a real time surface contour map that can be displayed in a heads-up display or other display to the pilot in substantially real time so the pilot can see below the aircraft and have the associated altitudes of the objects thereon. Particularly, the pilot will be able to see how the terrain below the platform looks. The surface contour map populated on the display of the pilot will be integrated with the altitude of the aircraft as well as the markers that may be present, which could be dangerous to the landing of the platform. For example, it is envisioned that the system may be integrated with predictive features or predictive instructions or predictive functions to identify a marker, such as a large boulder, which can provide a warning to the pilot in response to the identification of the marker in the landing zone and the wide angle field of view overlap region of the platform. In one particular embodiment, the low altitude implementation of the passive altimeter of the present disclosure may be implemented for altitudes below 50 feet, or below 40 feet, or below 30 feet, or below 20 feet, or below 10 feet. The system may be integrated with additional functions to build the surface contour map of the ground surface below the platform as observed by the wide field of overlap area.

While some embodiments have referred to the platform 12 as a helicopter, it is to be understood that the platform can be any movable or fixed object that needs to determine a distance between itself and the ground or another object. For example, the platform 12 can be any type of flying device such as an aircraft, an aerial vehicle regardless of whether manned or unmanned. In another example, the platform does not need to be a flying object. In this example, the system can be mounted on a ground-based platform, that can be moving or can be fixed, such as a tank or a signal tower, respectively. In ground based platforms, the system can be used as a ranging system to determine the distance between the sensor on the ground-based platform and another object. Thus, the system can be utilized in scenarios when a range between two objects needs to be determined but other traditional or conventional ranging devices may not be available or it may be discouraged to use the same, such as a laser range finder.

Figure 5:
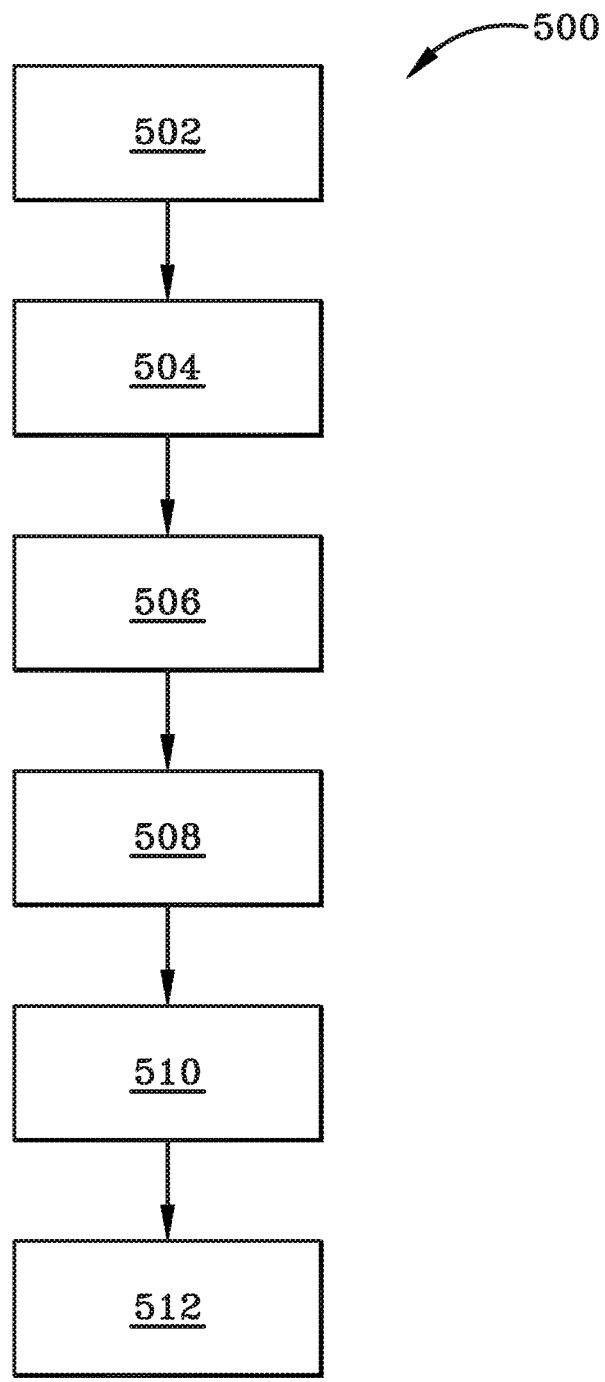
FIG. 5 (FIG. 5) is a flowchart depicting an exemplary method in accordance with the present disclosure.

FIG. 5 depicts an exemplary method in accordance with one aspect of an exemplary embodiment as shown generally at 500. Method 500 may include providing an aircraft with a legacy infrared counter measure (IRCM) system including at least one countermeasure sensor adapted to locate threats approaching the aircraft, which is shown generally at 502. Method 500 may include capturing at least one infrared (IR) image with the at least one countermeasure sensor, which is shown generally at 504. Method 500 may include receiving a second image from a remote source, which is shown generally at 506. Method 500 may include determining a fixed dimensional distance between two points in the second image, which is shown generally at 508. Method 500 may include determining, in the first image, an angle between the at least one countermeasure sensor and each of the same two points based, at least in part, on and accounting for distortion parameters of a lens in the at least one countermeasure sensor relative to a central boresight thereof, which is shown generally at 510. Method 500 may include triangulating an altitude of the aircraft relative to the ground with the legacy IRCM system based on the fixed dimensional distance between the same two points and the angle between the at least one countermeasure sensor and each of the two points, which is shown generally at 512. Method 500 may further include retrofitting the legacy IRCM system to calculate altitude of the aircraft; and triangulating the altitude of the aircraft in a GPS denied environment and without a laser range finder. Method 500 may further include descending the aircraft towards the ground surface 22; and generating a surface contour map in a display for a pilot, wherein the surface contour map is generated from the plurality of IR images captured by the at least one countermeasure sensor 14.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, which are shown generally as processor 20, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as the computer readable storage medium 18 (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

The system may use altitude calculation logic to obtain the altitude of the platform 12. "Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising"

can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in an different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. An altimeter system comprising:
   a platform adapted to be positioned at a distance relative to one of (i) a ground surface and (ii) a target;
   at least one sensor carried by the platform to capture a first image;
   a second image having a known resolution;
   at least one non-transitory computer readable storage medium having instructions encoded thereon that, when executed by a processor, perform operations to align the first image with the second image to triangulate the distance of the platform relative to the ground surface or the target, and the instructions including:
      store, at least temporarily, the first and second images on the at least one non-transitory computer readable storage medium;
      determine a dimensional distance in the first image based on corresponding similar features in the second image;
      determine an angle between a boresight and an object in the first image based, at least in part, on distortion parameters of the at least one sensor; and
      triangulate the distance from the platform to the one of (i) the ground surface and (ii) the target based, at least in part, on the dimensional distance in the first image and the angle.

2. The altimeter system of claim 1, wherein the platform is a movable platform, and the distance between the movable platform and the ground surface is an altitude of the movable platform.

3. The altimeter system of claim 2, wherein the movable platform is a helicopter.

4. The altimeter system of claim 1, wherein the second image is generated from a source that is remote from the platform.

5. The altimeter system of claim 4, wherein the instructions further include: determine the dimensional distance in the second image prior to associating the dimensional distance with the first image.

6. The altimeter system of claim 5, wherein the source generating the second image is a secondary source providing the second image in a similar direction as the at least one sensor.

7. The altimeter system of claim 1, further comprising:
a second sensor carried by the platform spaced from the at least one sensor;
a first wide angle field of view associated with the at least one sensor;
a second wide angle field of view associated with the second sensor;
wherein the ground surface or the target is located in an overlap region defined by the first wide angle field of view (FOV) overlapping the second wide angle FOV.

8. The altimeter system of claim 7, further comprising a sloped ground surface in the overlap region and the target is an obstacle in the overlap region.

9. The altimeter system of claim 8, wherein the instructions further include:
detect the sloped ground surface or the obstacle in the overlap region as the platform is descending towards the ground surface; and
warn an operator that the ground surface is sloped or of the obstacle below the platform.

10. The altimeter system of claim 8, wherein the instructions further include:
display a surface contour map of the ground surface below the platform, as the platform is descending, to an operator.

11. The altimeter system of claim 1, further comprising:
a plurality of sensors carried by the platform, wherein the at least one sensor is part of the plurality of sensors;
a third image captured by a second sensor from the plurality of sensors;
an overlap region present in each of the first image and the third image, wherein a unique marker is in the overlap region; and
the instructions further including:
determine proximity of the platform respectively to the unique markers in the overlap region based, at least in part, on known mounting locations of the first and second sensors on the platform and on known distortion parameters of a lens on each of the first and second sensors.

12. The altimeter system of claim 11, wherein the at least one sensor and the second sensors carried by the platform are passive infrared (IR) sensors, wherein at least the first image is an IR image.

13. The altimeter system of claim 12, wherein the instructions further including compare the IR first image with the second image which is one of (i) an IR image, and (ii) a non-IR image.

14. The altimeter system of claim 1, wherein the instructions further including activate the at least one sensor, which is part of an infrared countermeasure (IRCM) system, to determine the distance between the platform and the ground surface responsive to a global positioning system (GPS) in the platform being denied.

15. A method comprising:
providing an aircraft with a legacy infrared counter measure (IRCM) system including at least one countermeasure sensor adapted to locate threats approaching the aircraft;
capturing at least one infrared (IR) first image with the at least one countermeasure sensor;
receiving a second image from a remote source;
determining a fixed dimensional distance between two points in the second image;
determining, in the first image, an angle between the at least one countermeasure sensor and each of the same two points based, at least in part, on and accounting for distortion parameters of a lens in the at least one countermeasure sensor relative to a central boresight thereof; and
triangulating an altitude of the aircraft relative to the ground with the legacy IRCM system based on the fixed dimensional distance between the same two points and the angle between the at least one countermeasure sensor and each of the two points.

16. The method of claim 15, further comprising:
retrofitting the legacy IRCM system to calculate the altitude of the aircraft;
triangulating the altitude of the aircraft in a GPS denied environment and without a laser range finder.

17. The method of claim 16, further comprising:
descending the aircraft towards a ground surface;
generating a surface contour map in a display for a pilot, wherein the surface contour map is generated from the a plurality of IR images captured by the at least one countermeasure sensor.

18. The method of claim 17, further comprising:
detecting a sloped surface beneath the aircraft prior to landing;
effecting the aircraft to move to a flat ground portion.

19. The method of claim 16, further comprising:
determining a second dimensional distance in the first image to increase the accuracy of the altitude of the aircraft.

20. A passive altimeter system comprising an angle between a point and a central boresight that is determined from distortion parameters of a lens in an infrared sensor in a countermeasure system on a mobile platform wherein the infrared sensor captures a first image for determining a distance between the mobile platform and one of (i) a ground surface and (ii) a target, and the passive altimeter system further comprising a dimensional distance between two points in the first image that is determined from a secondary source external to the countermeasure system, and a processor to triangulate the distance between the mobile platform and one of (i) the ground surface and (ii) the target based on the dimensional distance and the angle.

* * * * *